(12) United States Patent
Kilat et al.

(10) Patent No.: US 8,315,895 B1
(45) Date of Patent: Nov. 20, 2012

(54) METHOD AND SYSTEM FOR OBTAINING REVIEW UPDATES WITHIN A REVIEW AND RATING SYSTEM

(75) Inventors: Kyle Kilat, Mountain View, CA (US); Joseph Lasee, Mountain View, CA (US); Colin J. Roper, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 403 days.

(21) Appl. No.: 12/573,644

(22) Filed: Oct. 5, 2009

(51) Int. Cl.
*G06F 17/30* (2006.01)

(52) U.S. Cl. .................................... 705/7.11
(58) Field of Classification Search ............ 705/7.11
See application file for complete search history.

(56) References Cited

U.S. PATENT DOCUMENTS

| | | | | |
|---|---|---|---|---|
| 6,016,475 A | * | 1/2000 | Miller et al. | 705/7.29 |
| 6,047,271 A | * | 4/2000 | Danford-Klein et al. | 705/400 |
| 7,080,064 B2 | * | 7/2006 | Sundaresan | 1/1 |
| 7,873,551 B2 | * | 1/2011 | Srinivasan et al. | 705/30 |
| 7,962,511 B2 | * | 6/2011 | Barney | 707/776 |
| 8,041,590 B2 | * | 10/2011 | Sorensen et al. | 705/7.11 |

OTHER PUBLICATIONS

Ghose et al (Designing Nobel Review Ranking Systems: Predicting The Usefulness and Impact of Review), Aug. 2007, Department of information, pp. 1-7.*

* cited by examiner

*Primary Examiner* — Romain Jeanty
(74) *Attorney, Agent, or Firm* — McKay and Hodgson, LLP; Philip McKay; Sean P. Lewis

(57) ABSTRACT

A method and system for obtaining review and rating updates within a review and rating system whereby a review and rating system is provided and a given review or rating associated with a given business, service, product, or other content is submitted to the review and rating system. Contact information associated with the user submitting the given review or rating is also obtained and then upon the occurrence of one or more events, the user submitting the original review or rating is contacted and asked to update the original review or rating and/or to provide additional data. Once the user's update to the original review or rating, and/or any additional data, is/are obtained, the given review or rating is transformed to reflect the update to the original review or rating, and/or any additional data.

36 Claims, 2 Drawing Sheets

METHOD AND SYSTEM FOR OBTAINING REVIEW UPDATES WITHIN A REVIEW AND RATING SYSTEM

BACKGROUND

The emergence of the Internet as a major source of information and/or communication for many consumers has led to the development of numerous business, service, and/or product review and rating systems. The use of review and rating systems has also expanded into many areas beyond the Internet and traditional businesses, services, and/or products so that virtually any type of content, such as, but not limited to: ideas; articles; books; videos; links; pictures; applications; systems; shared documents and/or presentations, etc. can now include associated review and rating systems. Herein the term "review and rating system" includes, but is not limited to: websites devoted to, or at least including, business, service, and/or product review and rating systems as well as review and rating systems associated with other content such as: ideas; articles; books; videos; links; pictures; applications; systems; shared documents and/or presentations, or any other item or content to be rated and/or reviewed.

A typical review and rating system provides a review forum, and/or ratings system, and/or recommendation service, whereby contributors/users can share their opinions of given content with other viewers/users. Often, these review and rating systems are provided as either the primary focus of a given website, such as a consumer watchdog or consumer report website, or as a feature of a website devoted to other purposes, such as the sale of various products and/or services or an on-line auction.

In addition, many review and rating systems provide a cumulative score or overall rating associated with a given business, service, product, or other content. Typically this cumulative score or overall rating is simply the average of all the individual ratings received that are associated with a given business, service, product, or other content.

One indicator of the increasing presence, and importance, of review and rating systems is the fact that the number of review and rating systems associated with specific businesses and/or products doubled from 2006 to 2007. In addition, it is estimated that 98% of consumers now use the ratings and/or review data contained in one or more review and rating systems to guide their purchasing decisions. Consequently, review and rating systems have considerable, and seemingly ever increasing, power in both the electronic commerce and "brick and mortar" marketplaces.

One issue associated with currently available review and rating systems is that, currently, once a review and/or rating is entered into the review and rating system, it remains listed for extended periods of time, often in perpetuity, and is basically static, as is it's contribution to the cumulative score or overall rating associated with a given business, service, product, or other content. That is to say, using currently available review and rating systems, once a review and/or rating is entered, it often remains in the rating and review system long beyond the point that it is actually relevant to existing content and often long after the basis of a reviewer's comments are no longer valid or applicable.

As a result of this static nature of currently available review and rating systems, users of the review and rating systems may be given false and/or irrelevant impressions and information with respect to a current version of a given business, service, product, or other content being rated. This is clearly a less than ideal situation for all parties involved, i.e., the user, the provider of the review and rating system, and the owner/provider of the given business, service, product, or other content.

SUMMARY

In accordance with one embodiment, a method and system for obtaining review and rating updates within a review and rating system includes a process for obtaining review and rating updates within a review and rating system whereby, in one embodiment, a review and rating system is provided and a given review or rating associated with a given business, service, product, or other content is submitted to the review and rating system. In one embodiment, contact information associated with the user submitting the review or rating is also obtained. In one embodiment, upon the occurrence of one or more events, the user submitting the original review or rating is contacted and asked to update the original review or rating and/or to provide additional data regarding the original review or rating. Once the user's update to the original review or rating, and/or any additional data, is/are obtained, the given review or rating associated with a given business, service, product, or other content is transformed to reflect the update to the original review or rating, and/or any additional data. In one embodiment, any cumulative score or overall rating associated with a given business, service, product, or other content is also transformed to reflect the update to the original review or rating, and/or any additional data. In one embodiment, the one or more events include, but are not limited to: the passing of one or more defined periods of time; a change, revision, version update, or other modification to the given business, service, product, or other content; a change in circumstances external to the given business, service, product, or other content; input from other users of the review and rating system; a desired random or semi-random check of the review and rating system; the occurrence of defined text or content in a given review or rating; and/or any other event desired and/or defined by the review and rating system provider and/or the provider of the method and system for obtaining review and rating updates within a review and rating system.

In one embodiment, the review and rating system is an Internet based review and rating system and/or website devoted to, or at least including, business, service, and/or product review and rating systems. In one embodiment, the review and rating system is associated with, and/or is part of, a given website that is a dedicated review and/or ratings forum website.

In one embodiment, the review and rating system is associated with, and/or is part of, a given website that is not a dedicated review and/or ratings forum website such as, but not limited to: a retailer website; an Internet warehouse website; a product and/or service website; a product and/or service provider website; a product and/or service producer's website; an Internet auction website; a community-based website; a social interaction website; or any other website including a review and/or ratings mechanism.

In one embodiment, the review and rating system is any review and rating system associated with other content such as: ideas; articles; books; videos; links; pictures; applications; systems; shared documents or presentations; or any other item or content being rated and/or reviewed.

In one embodiment, the review and rating system is accessed through any network of computing systems and/or server systems that is comprised of multiple different computers, wireless devices, cellular telephones, digital telephones, two-way pagers, personal digital assistants, server computers, or any desired combination of these devices, that are interconnected using a network.

Review and rating systems, as well as methods and apparatuses for implementing review and rating systems, are well-known to those of skill in the art. Consequently, a more detailed discussion of review and rating systems, as well as methods and apparatuses for implementing review and rating systems is omitted here to avoid detracting from the invention.

In one embodiment, the given review or rating associated with a given business, service, product, or other content is submitted to the review and rating system via a user interface screen displayed on a display device associated with a computing system. In one embodiment, the given review or rating associated with a given business, service, product, or other content is submitted to the review and rating system using a user interface device such as a mouse, keyboard, touchpad, touch screen, voice recognition software, or any other device for translating user actions into computing system readable instructions and/or actions.

In one embodiment, the contact information associated with a user submitting a review or rating associated with a given business, service, product, or other content is obtained by the review and rating system when a user registers with the review and rating system. In one embodiment, the contact information associated with a user submitting a review or rating associated with a given business, service, product, or other content is obtained by the review and rating system when the user submits a review or rating associated with a given business, service, product, or other content.

In one embodiment, the contact information includes, but is not limited to, any one or more of the following: an e-mail address; a physical address; a phone number; or any other contact information for a user desired by the provider of the process for obtaining review and rating updates within a review and rating system and or the provider of the review and rating system.

In one embodiment, upon the occurrence of one or more events, the user submitting the original review or rating is contacted and asked to update the original review or rating and/or to provide additional data regarding the original review or rating through the review and rating system itself. In one embodiment, upon the occurrence of one or more events, the user submitting the original review or rating is contacted and asked to update the original review or rating and/or to provide additional data regarding the original review or rating through the review and rating system itself when the user logs on to the review and rating system.

In one embodiment, upon the occurrence of one or more events, the user submitting the original review or rating is contacted and asked to update the original review or rating and/or to provide additional data regarding the original review or rating through e-mail or through text messaging.

In one embodiment, upon the occurrence of one or more events, the user submitting the original review or rating is contacted and asked to update the original review or rating and/or to provide additional data regarding the original review or rating using traditional methods such as postal service or telephone.

In one embodiment, upon the occurrence of one or more events, the user submitting the original review or rating is contacted and asked to update the original review or rating and/or to provide additional data regarding the original review or rating through any means for obtaining, collecting, accessing, entering, transferring, relaying, providing and requesting data, whether known at the time of filing or as developed thereafter. For instance, in one embodiment, upon the occurrence of one or more events, the user submitting the original review or rating is contacted and asked to update the original review or rating and/or to provide additional data regarding the original review or rating through a network of computing systems and/or server systems that is comprised of multiple different computers, wireless devices, cellular telephones, digital telephones, two-way pagers, personal digital assistants, server computers, or any desired combination of these devices, that are interconnected using a network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In one embodiment, upon the occurrence of one or more events, the user submitting the original review or rating is contacted and asked to update the original review or rating and/or to provide additional data regarding the original review or rating using any method, apparatus, process or mechanism for transferring data and/or text from one or more devices, computing systems, server systems, databases, web site/web functions and/or any devices to one or more other devices, computing systems, server systems, databases, web site/web functions and/or any devices, whether known at the time of filing or as thereafter developed.

In one embodiment, the event is the passing of a defined time period. In one embodiment, upon the passing of the given time period, the user submitting the original review or rating is contacted and asked to update the original review or rating and/or to provide additional data regarding the original review or rating based on the theory that the given review or rating associated with the given business, service, product, or other content is likely less relevant as time goes on.

In one embodiment, the event is a change, revision, version update, or other modification to the given business, service, product, or other content. In one embodiment, upon a change, revision, version update, or other modification to the given business, service, product, or other content, the user submitting the original review or rating is contacted and asked to update the original review or rating and/or to provide additional data regarding the original review or rating based on the theory that the given review or rating associated with the given business, service, product, or other content is likely less relevant to the new version of the business, service, product, or other content.

In one embodiment, the event is a change in circumstances external to the given business, service, product, or other content. In one embodiment, upon a change in circumstances external to the given business, service, product, or other content, the user submitting the original review or rating is contacted and asked to update the original review or rating and/or to provide additional data regarding the original review or rating to reflect the external change and/or based on the theory that the given review or rating associated with the given business, service, product, or other content is likely less, or more, relevant in light of the change in circumstances external to the given business, service, product, or other content.

In one embodiment, the event is the given review or rating associated with the given business, service, product, or other content being rated by other users of the review and rating system as unhelpful or irrelevant.

In one embodiment, the event is the given review or rating associated with the given business, service, product, or other content becoming inconsistent with an average or cumulative score or overall rating associated with the given business, service, product, or other content as provided by other users of the review and rating system.

In one embodiment, the event is a desired random or semi-random check of the review and rating system made to try and weed out illegitimate or malicious reviews.

In one embodiment, the event is a determination that the given review or rating associated with the given business, service, product, or other content is, or has become, inappropriate.

In one embodiment, the event is the occurrence of defined text or content in the a given review or rating associated with the given business, service, product, or other content indicating the review or rating is no loner relevant, or more relevant, to current conditions.

In one embodiment, the event and/or trigger is any other event desired and/or defined by the review and rating system provider and/or a provider of the method and system for obtaining review and rating updates within a review and rating system.

In various embodiments, the user submitting the original review or rating is contacted and asked to update the original review or rating and/or to provide additional data regarding the original review or rating based on the occurrence of two or more events. For instance, in one example of one embodiment, the user submitting the original review or rating is contacted and asked to update the original review or rating and/or to provide additional data regarding the original review or rating only in the event of a deified period of time passing and a given change, revision, version update, or other modification to the given business, service, product, or other content that takes place on a given date. As another example of one embodiment, the user submitting the original review or rating is contacted and asked to update the original review or rating and/or to provide additional data regarding the original review or rating based on a change in circumstances external to the given business, service, product, or other content and defined text or content in the a given review or rating associated with the given business, service, product, or other content indicating the given review or rating is particularly affected by the change in circumstances external to the given business.

In one embodiment, if one or more requests for the user's update to the original review or rating, and/or any additional data, are not responded to, the given original review or rating is dropped off/removed from the review and rating system. In one embodiment, if one or more requests for the user's update to the original review or rating, and/or any additional data, are not responded to, the given original review or rating is degraded and/or a lesser value or weight is assigned to the given original review or rating. In one embodiment, if one or more requests for the user's update to the original review or rating, and/or any additional data, are not responded to, the given original review or rating is allowed to remain on the review or rating system but a notation, or other indicator, is attached and/or associated with given original review or rating indicating that no response has been received to the request(s) for update to the original review or rating, and/or any additional data.

In one embodiment, once the user's update to the original review or rating, and/or any additional data, is/are obtained, the data representing the given review or rating associated with a given business, service, product, or other content is transformed, i.e., modified, to reflect the update to the original review or rating, and/or any additional data.

In one embodiment, once the user's update to the original review or rating, and/or any additional data, is/are obtained, the given review or rating associated with a given business, service, product, or other content is replaced with the updated original review or rating, and/or any additional data.

In one embodiment, a cumulative score or overall rating associated with a given business, service, product, or other content is also transformed once the user's update to the original review or rating, and/or any additional data, is/are obtained.

Using the method and system for obtaining review and rating updates within a review and rating system, as disclosed herein, reviews and ratings are more likely to be updated so that the reviews and ratings are potentially more relevant to a current version/form of a given business, service, product, or other content. As a result, using the method and system for obtaining review and rating updates within a review and rating system, disclosed herein, users of the review and rating systems are less likely to be given false and/or irrelevant impressions and information with respect to a current version of a given business, service, product, or other content being rated. Consequently, all parties involved, i.e., the user, the provider of the review and rating system, and the owner/provider of the given business, service, product, or other content are benefitted by using the method and system for obtaining review and rating updates within a review and rating system, as disclosed herein.

In addition, as discussed in more detail below, using the below embodiments, with little or no modification and/or user input, there is considerable flexibility, adaptability, and opportunity for customization to meet the specific needs of various user's under numerous circumstances.

Figure 1:
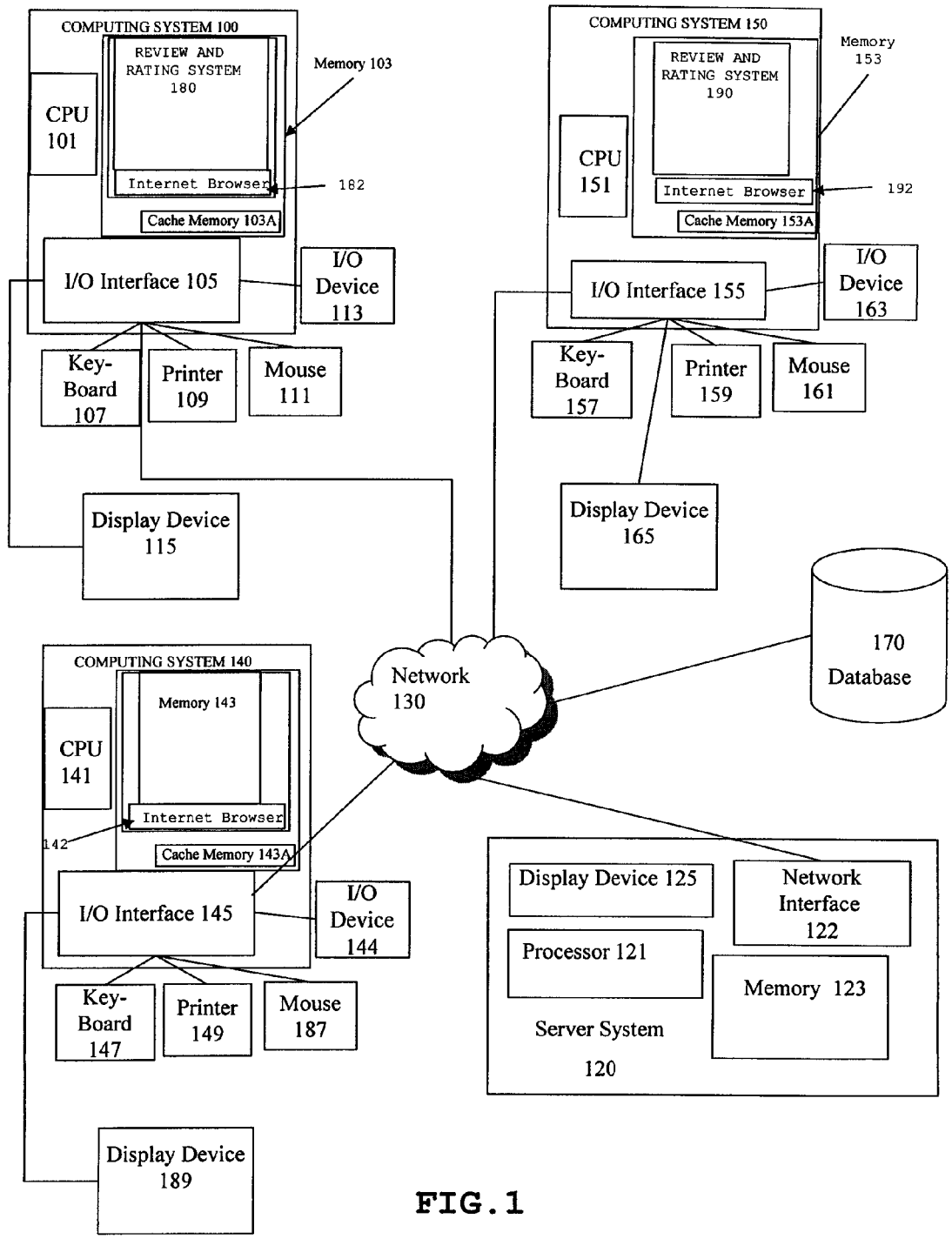
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for obtaining review and rating updates within a review and rating system includes a process for obtaining review and rating updates within a review and rating system whereby, in one embodiment, a review and rating system is provided and a given review or rating associated with a given business, service, product, or other content is submitted to the review and rating system. In one embodiment, contact information associated with the user submitting the review or rating is also obtained. In one embodiment, upon the occurrence of one or more events, the user submitting the original review or rating is contacted and asked to update the original review or rating and/or to provide additional data regarding the original review or rating. Once the user's update to the original review or rating, and/or any additional data, is/are obtained, the given review or rating associated with a given business, service, product, or other content is transformed to reflect the update to the original review or rating, and/or any additional data. In one embodiment, any cumulative score or overall rating associated with a given business, service, product, or other content is also transformed to reflect the update to the original review or rating, and/or any additional data. In one embodiment, the one or more events include, but are not limited to: the passing of one or more defined periods of time; a change, revision, version update, or other modification to the given business, service, product, or other content; a change in circumstances external to the given business, service, product, or other content; input from other users of the review and rating system; a desired random or semi-random check of the review and rating system; the occurrence of defined text or content in a given review or rating; and/or any other event desired and/or defined by the review and rating system provider and/or the provider of the method and system for obtaining review and rating updates within a review and rating system.

FIG. 1 is a block diagram of an exemplary hardware architecture for implementing one embodiment of a system and method for obtaining review and rating updates within a review and rating system, such as exemplary process 200 (FIG. 2) discussed herein, that, returning to FIG. 1, includes: a computing system 100, e.g., a first computing system; a computing system 150, e.g., a second computing system; a computing system 140, e.g., a third computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a review and rating system 180, such as discussed herein, and/or known in the art at the time of filing, and/or as developed after the time of filing. In one embodiment, review and rating system 180 is stored, in whole, or in part, in memory system 103, and is used by, or includes, is provided by, or is accessed by, a process for obtaining review and rating updates within a review and rating system (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, all, or part of, a process for obtaining review and rating updates within a review and rating system, and/or a review and rating system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data associated with one or more review and rating systems, and/or contact data associated with one or more users, is stored, in whole, or in part, in memory system 103, and is used by, or is accessed by, a process for obtaining review and rating updates within a review and rating system and/or one or more users. In one embodiment, computing system 100 is a computing system accessible by one or more review and rating systems and/or one or more users. In one embodiment, computing system 100 is used, and/or accessible, by another computing system, such as computing systems 150 and/or 140 (discussed below).

Computing system 100 can be any computing system as defined herein and/or as known in the art at the time of filing and/or as developed thereafter, that includes components that can execute all, or part, of a process for obtaining review and rating updates within a review and rating system, and/or a review and rating system, in accordance with at least one of the embodiments as described herein.

As also seen in FIG. 1, computing system 150 typically includes a central processing unit (CPU) 151, an input/output (I/O) interface 155, and a memory system 153, including cache memory 153A. In one embodiment, memory system 153 includes all, or part, of a second review and rating system 190, such as any review and rating system discussed herein, known in the art at the time of filing, and/or as developed thereafter. In one embodiment, review and rating system 190 is stored, in whole, or in part, in memory system 153, and is used by, or includes, or is accessed by, and/or is otherwise associated with a process for obtaining review and rating updates within a review and rating system (not shown in FIG. 1, see FIG. 2).

Returning to FIG. 1, computing system 150 may further include standard user interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, all, or part of, a process for obtaining review and rating updates within a review and rating system, and/or a review and rating system, are entered, in whole, or in part, into computing system 150 via I/O device 163, such as from a CD, DVD, floppy disk, portable hard drive, memory stick, download site, or other medium and/or computer program product as defined herein.

In one embodiment, computing system 150 also includes an Internet browser capability 192 that, in one embodiment, includes a search engine (not shown) and is stored, in whole, or in part in memory 153.

In one embodiment, data associated with one or more review and rating systems is stored, and/or contact data associated with one or more users, in whole, or in part, in memory system 153, and is used by, or is accessed by, a process for obtaining review and rating updates within a review and rating system and/or one or more users. In one embodiment, computing system 150 is a computing system accessible by one or more review and rating systems and/or one or more users. In one embodiment, computing system 150 is used, and/or accessible, by another computing system, such as computing systems 100 and/or 140 (discussed below).

Computing system 150 can be any computing system as defined herein and/or as known in the art at the time of filing and/or as developed thereafter, that includes components that can execute all, or part, of a process for obtaining review and rating updates within a review and rating system, and/or a review and rating system, in accordance with at least one of the embodiments as described herein.

As also seen in FIG. 1, computing system 140 typically includes a central processing unit (CPU) 141, an input/output (I/O) interface 145, and a memory system 143, including cache memory 143A.

Returning to FIG. 1, computing system 140 may further include standard user interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for obtaining review and rating updates within a review and rating system, and/or a review and rating system, are entered, in whole, or in part, into computing system 140 via I/O device 144, such as from a CD, DVD, floppy disk, portable hard drive, memory stick, download site, or other medium and/or computer program product as defined herein.

In one embodiment, computing system 140 also includes an Internet browser capability 142 that, in one embodiment, includes a search engine (not shown) and is stored, in whole, or in part in memory 143.

In one embodiment, data associated with a process for obtaining review and rating updates within a review and rating system and/or one or more review and rating systems, and/or contact data associated with one or more users, is stored, in whole, or in part, in memory system 143. In one embodiment, computing system 140 is a computing system accessible by one or more users. In one embodiment, computing system 140 is used, and/or accessible, by another computing system, such as computing systems 150 and/or 100.

Computing system 140 can be any computing system as defined herein and/or as known in the art at the time of filing and/or as developed thereafter, that includes components that can execute all, or part, of a process for obtaining review and rating updates within a review and rating system, and/or a review and rating system, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for obtaining review and rating updates within a review and rating system, and/or a review and rating system.

In one embodiment, data associated with one or more review and rating systems and/or events, and/or contact data associated with one or more users, is stored, in whole, or in part, in database 170, and is used by, or is accessed by, a process for obtaining review and rating updates within a review and rating system. In one embodiment, database 170 is accessible by one or more one or more providers of one or more review and rating systems, and/or other users. In one embodiment, database 170 is used, and/or accessible, by a computing system, such as computing systems 100, 140, and/or 150, and/or a server system, such as sever system 120 (discussed below).

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data associated with one or more review and rating systems and/or events is stored, in whole, or in part, in server system 120, and is used by, or is accessed by, a process for obtaining review and rating updates within a review and rating system. In one embodiment, server system 120 is accessible by one or more users. In one embodiment, server system 120 is used, and/or accessible, by a computing system, such as computing systems 100, 140, and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 is not relevant.

As discussed in more detail below, in one embodiment, a process for obtaining review and rating updates within a review and rating system, and/or one or more review and rating systems, and/or data associated with one or more events, and/or contact data associated with one or more users, is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Although a process for obtaining review and rating updates within a review and rating system is at times referred to herein, alternatively, as a process, an application, a module, a program, a component of a software system, a component of a software package, a component of a parent system, a plug-in, or a feature of a parent system, this terminology is illustrative only. In some embodiments, a process for obtaining review and rating updates within a review and rating system is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for obtaining review and rating updates within a review and rating system, and/or one or more review and rating systems, and/or data associated with one or more events, and/or contact data associated with one or more users, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "user" includes any person, party, business, system, application, organization, and/or entity interacting with, interfacing with, contacting, viewing, accepting data from, requesting data from, and/or otherwise associating with the process for obtaining review and rating updates within a review and rating system for any purpose and/or a review and rating system.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the terms "review and rating system", "Internet based business and/or product review system", and "Internet based business and/or product review and/or rating system" are used interchangeable and include, but are not limited to any system, subsystem, package, program, module, web-function, or application that provides a review forum, and/or ratings system, and/or recommendation service, whereby various parties can share their opinions of a given business and/or product with other potential consumers of the business and/or product.

As used herein, the term "computing system implemented data management system" includes, but is not limited to: computing system implemented accounting and/or invoicing systems, packages, programs, modules, or applications; computing system implemented financial management systems, packages, programs, modules, or applications; computing system implemented online account management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for obtaining review and rating updates within a review and rating system includes a process for obtaining review and rating updates within a review and rating system whereby, in one embodiment, a review and rating system is provided and a given review or rating associated with a given business, service, product, or other content is submitted to the review and rating system. In one embodiment, contact information associated with the user submitting the review or rating is also obtained. In one embodiment, upon the occurrence of one or more events, the user submitting the original review or rating is contacted and asked to update the original review or rating and/or to provide additional data regarding the original review or rating. Once the user's update to the original review or rating, and/or any additional data, is/are obtained, the given review or rating associated with a given business, service, product, or other content is transformed to reflect the update to the original review or rating, and/or any additional data. In one embodiment, any cumulative score or overall rating associated with a given business, service, product, or other content is also transformed to reflect the update to the original review or rating, and/or any additional data. In one embodiment, the one or more events include, but are not limited to: the passing of one or more defined periods of time; a change, revision, version update, or other modification to the given business, service, product, or other content; a change in circumstances external to the given business, service, product, or other content; input from other users of the review and rating system; a desired random or semi-random check of the review and rating system; the occurrence of defined text or content in a given review or rating; and/or any other event desired and/or defined by the review and rating system provider and/or the provider of the method and system for obtaining review and rating updates within a review and rating system.

Figure 2:
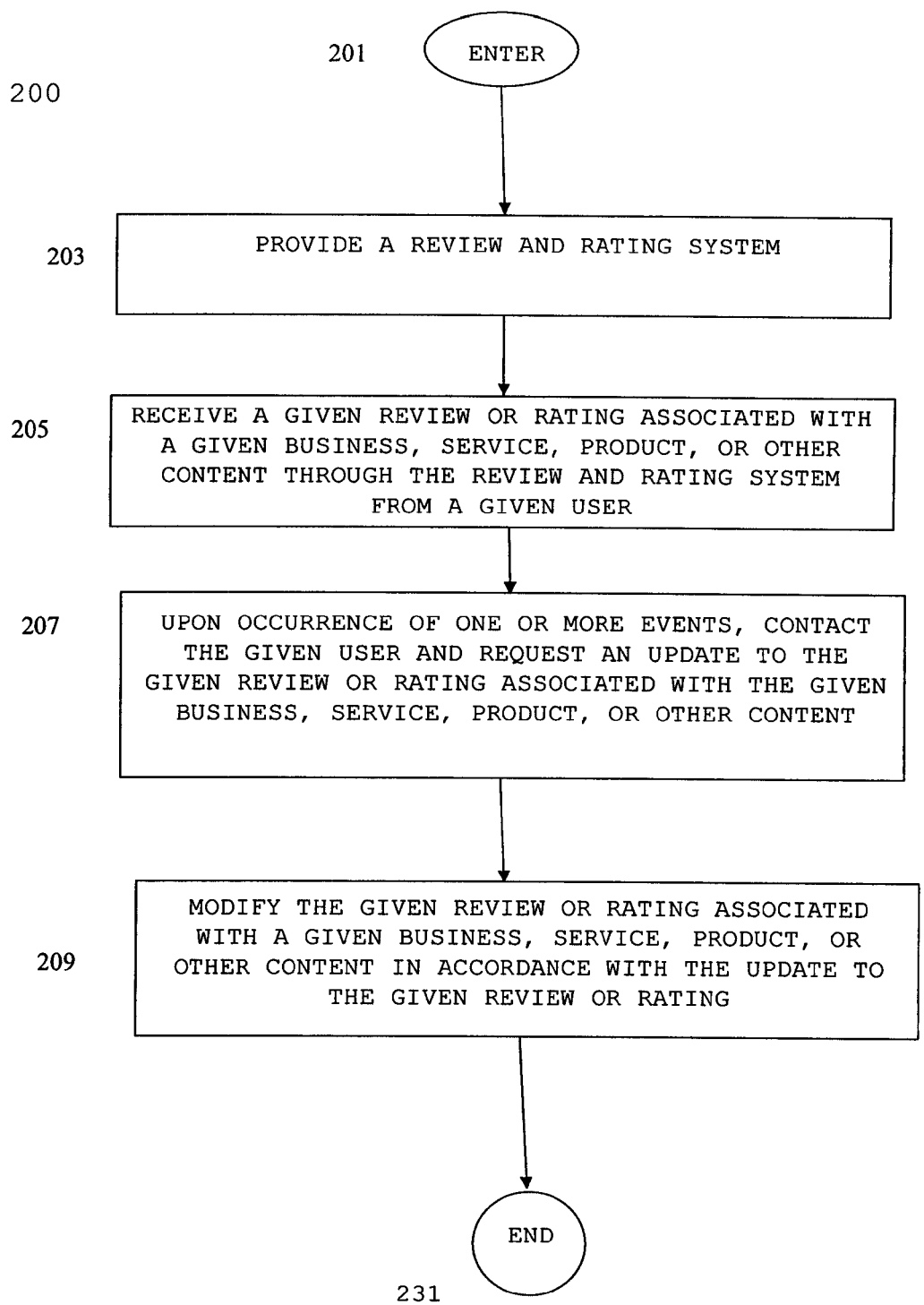
FIG. 2 is a flow chart depicting a process for obtaining review and rating updates within a review and rating system in accordance with one embodiment.

FIG. 2 is a flow chart depicting a process for obtaining review and rating updates within a review and rating system 200 in accordance with one embodiment. Process for obtaining review and rating updates within a review and rating system 200 begins at ENTER OPERATION 201 and process flow proceeds to PROVIDE A REVIEW AND RATING SYSTEM OPERATION 203.

In one embodiment, at PROVIDE A REVIEW AND RATING SYSTEM OPERATION 203 a review and rating system is provided.

In one embodiment, at PROVIDE A REVIEW AND RATING SYSTEM OPERATION 203 a review and rating system, such as review and rating systems 180 and 190 of FIG. 1 is provided.

Returning to FIG. 2, in one embodiment, the review and rating system provided at PROVIDE A REVIEW AND RATING SYSTEM OPERATION 203 is an Internet based review and rating system and/or website devoted to, or at least including, business, service, and/or product review and rating systems.

In one embodiment, the review and rating system provided at PROVIDE A REVIEW AND RATING SYSTEM OPERATION 203 is associated with, and/or are part of, a given website that is a dedicated review and/or ratings forum website.

In one embodiment, the review and rating system provided at PROVIDE A REVIEW AND RATING SYSTEM OPERATION 203 is associated with, and/or is part of, a given website that is not a dedicated review and/or ratings forum website such as, but not limited to: a retailer website; an Internet warehouse website; a product and/or service website; a product and/or service provider website; a product and/or service producer's website; an Internet auction website; a community-based website; a social interaction website; or any other website including a review and/or ratings mechanism.

In one embodiment, the review and rating system provided at PROVIDE A REVIEW AND RATING SYSTEM OPERATION 203 is any review and rating system associated with other content such as: ideas; articles; books; videos; links; pictures; applications; systems; shared documents or presentations; or any other item or content to be rated and/or reviewed.

In one embodiment, the review and rating system provided at PROVIDE A REVIEW AND RATING SYSTEM OPERATION 203 is accessed through any network, such as network 130 of FIG. 1, including computing systems, such as computing systems 100, 140 and/or 140 of FIG. 1, and/or server systems, such as server system 120 of FIG. 1, that is comprised of multiple different computers, wireless devices, cellular telephones, digital telephones, two-way pagers, personal digital assistants, server computers, or any desired combination of these devices, that are interconnected using a network.

In one embodiment, contact information associated with a user submitting a review or rating associated with a given business, service, product, or other content is obtained by the review and rating system when a user registers with the review and rating system. In one embodiment, the contact information includes, but is not limited to, any one or more of the following: an e-mail address; a physical address; a phone number; or any other contact information for a user desired by the provider of the process for obtaining review and rating updates within a review and rating system and or the provider of the review and rating system.

Review and rating systems, as well as methods and apparatuses for implementing review and rating systems, are well-known to those of skill in the art. Consequently, a more detailed discussion of review and rating systems, as well as methods and apparatuses for implementing review and rating systems is omitted here to avoid detracting from the invention.

Returning to FIG. 2, in one embodiment, once a review and rating system is provided at PROVIDE A REVIEW AND RATING SYSTEM OPERATION 203, process flow proceeds to RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205.

In one embodiment, at RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205 a given review or rating associated with a given business, service, product, or other content is submitted to the review and rating system of PROVIDE A REVIEW AND RATING SYSTEM OPERATION 203.

In one embodiment, the given review or rating associated with a given business, service, product, or other content is submitted to the review and rating system at RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205 via a user interface screen displayed on a display device, such as display devices 115, 165, 189 and 125, of FIG. 1, associated with a computing system, such as computing systems 100, 140, 150 and server system 120 of FIG. 1.

Returning to FIG. 2, in one embodiment, the given review or rating associated with a given business, service, product, or other content is submitted to the review and rating system at RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205 using a user interface device such as a mouse 111, 161, 187, of FIG. 1, a keyboard 107, 157, 147 of FIG. 1, a touchpad, a touch screen, voice recognition software, or any other device for translating user actions into computing system readable instructions and/or actions, as discussed herein, and/or known in the art at the time of filing, and/or as developed after the time of filing.

Returning to FIG. 2, in one embodiment, contact information associated with a user submitting a review or rating associated with a given business, service, product, or other content is obtained by the review and rating system when the user submits a review or rating associated with a given business, service, product, or other content.

In one embodiment, the contact information includes, but is not limited to, any one or more of the following: an e-mail address; a physical address; a phone number; or any other contact information for a user desired by the provider of the process for obtaining review and rating updates within a review and rating system and or the provider of the review and rating system.

In one embodiment, once a given review or rating associated with a given business, service, product, or other content is submitted to the review and rating system of PROVIDE A REVIEW AND RATING SYSTEM OPERATION 203 at RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205, process flow proceeds to UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207.

In one embodiment, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207, upon the occurrence of one or more events, the user submitting the original review or rating is contacted and asked to update the original review or rating and/or to provide additional data regarding the original review or rating.

In one embodiment, the one or more events of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 include, but are not limited to: the passing of one or more defined periods of time; a change, revision, version update, or other modification to the given business, service, product, or other content; a change in circumstances external to the given business, service, product, or other content; input from other users of the review and rating system; a desired random or semi-random check of the review and rating system; the occurrence of defined text or content in a given review or rating; and/or any other event desired and/or defined by the review and rating system provider and/or the provider of the method and system for obtaining review and rating updates within a review and rating system.

In one embodiment, the event of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is the passing of a defined time period. In one embodiment, upon the passing of the given time period, the user submitting the original review or rating is contacted and asked to update the original review or rating and/or to provide additional data regarding the original review or rating based on the theory that the given review or rating associated with the given business, service, product, or other content is likely less relevant as time goes on.

In one embodiment, the event of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is a change, revision, version update, or other modification to the given business, service, product, or other content. In one embodiment, upon a change, revision, version update, or other modification to the given business, service, product, or other content, the user submitting the original review or rating is contacted and asked to update the original review or rating and/or to provide additional data regarding the original review or rating based on the theory that the given review or rating associated with the given business, service, product, or other content is likely less relevant to the new version of the business, service, product, or other content. As a specific example, if a new version of the business, service, product, or other content is provided, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 it can be stipulated that the users submitting all reviews or ratings associated with the given business, service, product, or other content prior to the new version be contacted and an update requested.

In one embodiment, the event of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is a change in circumstances external to the given business, service, product, or other content. In one embodiment, upon a change in circumstances external to the given business, service, product, or other content, the user submitting the original review or rating is contacted and asked to update the original review or rating and/or to provide additional data regarding the original review or rating to reflect the external change and/or based on the theory that the given review or rating associated with the given business, service, product, or other content is likely less, or more, relevant in light of the change in circumstances external to the given business, service, product, or other content. As a specific example, in one embodiment, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207, it can then be stipulated that if the price of gasoline increases by a defined amount, all the users submitting reviews or ratings associated with hybrid vehicles prior to the increase in price be contacted and an update requested.

In one embodiment, the event of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is the given review or rating associated with the given business, service, product, or other content being rated by other users of the review and rating system as unhelpful or irrelevant. As an example, many review and rating systems currently ask users to rate reviews and ratings as being helpful or not helpful. In one embodiment, if a given review or rating associated with the given business, service, product, or other content is given a threshold number of not helpful ratings, then at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 the given user having submitted the given review or rating associated with the given business, service, product, or other content is contacted and an update and/or more data is requested.

In one embodiment, the event of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is the given review or rating associated with the given business, service, product, or other content becoming inconsistent with an average or cumulative score or overall rating associated with the given business, service, product, or other content as provided by other users of the review and rating system. As an example, many review and rating systems currently provide average or cumulative scores or overall ratings associated with the given business, service, product, or other content. In one embodiment, if a given review or rating associated with the given business, service, product, or other content is outside a given threshold of the average or cumulative score or overall rating associated with the given business, service, product, or other content, then at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 the given user having submitted the given review or rating associated with the given business, service, product, or other content is contacted and an update and/or more data is requested.

In one embodiment, the event of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is a desired random or semi-random check of the review and rating system made to try and weed out illegitimate or malicious reviews.

In one embodiment, the event of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is a determination that the given review or rating associated with the given business, service, product, or other content is, or has become, inappropriate.

In one embodiment, the event of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is the presence of defined text or content in the a given review or rating associated with the given business, service, product, or other content indicating the review or rating is no loner relevant, or more relevant, to current conditions. As a specific example, if text in a given review or rating associated with the given business, service, product, or other content indicates that "with gas so cheap, the mileage is not an issue". Then at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 it can be stipulated that the given user of the given review or rating associated with the given business, service, product, or other content be contacted if the price of gas increases significantly.

In one embodiment, the event and/or trigger of UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 is any other event desired and/or defined by the review and rating system provider and/or a provider of the method and system for obtaining review and rating updates within a review and rating system.

In various embodiments, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 the user submitting the original review or rating is contacted and asked to update the original review or rating and/or to provide additional data regarding the original review or rating based on the occurrence of two or more events. For instance, in one example of one embodiment, the user submitting the original review or rating is contacted and asked to update the original review or rating and/or to provide additional data regarding the original review or rating only in the event of a deified period of time passing and a given change, revision, version update, or other modification to the given business, service, product, or other content that takes place on a given date. As another example of one embodiment, the user submitting the original review or rating is contacted and asked to update the original review or rating and/or to provide additional data regarding the original review or rating based on a change in circumstances external to the given business, service, product, or other content and defined text or content in the a given review or rating associated with the given business, service, product, or other content indicating the given review or rating is particularly affected by the change in circumstances external to the given business.

In one embodiment, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207, upon the occurrence of one or more events, the user submitting the original review or rating is contacted and asked to update the original review or rating and/or to provide additional data regarding the original review or rating through the review and rating system of PROVIDE A REVIEW AND RATING SYSTEM OPERATION 203 itself. In one embodiment, upon the occurrence of one or more events, the user submitting the original review or rating is contacted and asked to update the original review or rating and/or to provide additional data regarding the original review or rating through the review and rating system PROVIDE A REVIEW AND RATING SYSTEM OPERATION 203 itself when the user logs on to the review and rating system.

In one embodiment, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 upon the occurrence of one or more events, the user submitting the original review or rating is contacted and asked to update the original review or rating and/or to provide additional data regarding the original review or rating through e-mail or through text messaging.

In one embodiment, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 upon the occurrence of one or more events, the user submitting the original review or rating is contacted and asked to update the original review or rating and/or to provide additional data regarding the original review or rating using traditional methods such as postal service or telephone.

In one embodiment, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 upon the occurrence of one or more events, the user submitting the original review or rating is contacted and asked to update the original review or rating and/or to provide additional data regarding the original review or rating through any means for obtaining, collecting, accessing, entering, transferring, relaying, providing and requesting data, whether known at the time of filing or as developed thereafter. For instance, in one embodiment, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207 upon the occurrence of one or more events, the user submitting the original review or rating is contacted and asked to update the original review or rating and/or to provide additional data regarding the original review or rating through a network, such as network 130 of FIG. 1, of computing systems, such as computing systems 100, 140 and/or 150 of FIG. 1, and/or server systems, such as server system 120 of FIG. 1, that is comprised of multiple different computers, wireless devices, cellular telephones, digital telephones, two-way pagers, personal digital assistants, server computers, or any desired combination of these devices, that are interconnected using a network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

Returning to FIG. 2, in one embodiment, at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207, upon the occurrence of one or more events, the user submitting the original review or rating is contacted and asked to update the original review or rating and/or to provide additional data regarding the original review or rating using any method, apparatus, process or mechanism for transferring data and/or text from one or more devices, computing systems, server systems, databases, web site/web functions and/or any devices to one or more other devices, computing systems, server systems, databases, web site/web functions and/or any devices, whether known at the time of filing or as thereafter developed.

In one embodiment, once, upon the occurrence of one or more events, the user submitting the original review or rating is contacted and asked to update the original review or rating and/or to provide additional data regarding the original review or rating at UPON OCCURRENCE OF ONE OR MORE EVENTS, CONTACT THE GIVEN USER AND REQUEST AN UPDATE TO THE GIVEN REVIEW OR RATING ASSOCIATED WITH THE GIVEN BUSINESS, SERVICE, PRODUCT, OR OTHER CONTENT OPERATION 207, process flow proceeds to MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209.

In one embodiment, at MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209, once the user's update to the original review or rating, and/or any additional data, is/are obtained, the given review or rating associated with a given business, service, product, or other content of RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205 is transformed to reflect the update to the original review or rating, and/or any additional data. In one embodiment, any cumulative score or overall rating associated with a given business, service, product, or other content is also transformed to reflect the update to the original review or rating, and/or any additional data.

In one embodiment, data representing one or more individual reviews and/or ratings associated with a given business, service, product, or other content is represented using virtually any discrete symbol or symbols used to rate the given business, service, product, or other content. In one embodiment, data representing a weighted average of accumulated individual reviews or ratings is represented using virtually any discrete symbol or symbols used to rate the given business, service, product, or other content.

In one embodiment, data representing one or more individual reviews and/or ratings associated with a given business, service, product, or other content is represented using any singular symbol or graphical display capable of visually representing a review or rating and/or the weighted average of accumulated individual reviews or ratings. As an example, a thermometer, a sliding scale, any graphical representation, or any partially filed figure or symbol, or outline thereof may be used. Moreover, these symbols, graphical displays, and scales may, in some embodiments, display either an individual reviewer's level of satisfaction or dissatisfaction and/or the average of the accumulated individual reviewer's satisfaction or dissatisfaction.

In one embodiment, at MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209 any of the discrete symbol or symbols, data and/or graphical displays/symbols/representations discussed above are transformed to reflect the update to the original review or rating, and/or any additional data.

In one embodiment, if one or more requests for the user's update to the original review or rating, and/or any additional data, are not responded to, then at MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209 the given original review or rating is dropped off/removed from the review and rating system.

In one embodiment, if one or more requests for the user's update to the original review or rating, and/or any additional data, are not responded to, then at MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209 the given original review or rating is degraded and/or a lesser value or weight is assigned to the given original review or rating.

In one embodiment, if one or more requests for the user's update to the original review or rating, and/or any additional data, are not responded to, then at MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209 the given original review or rating is allowed to remain on the review or rating system but a notation, or other indicator, is attached and/or associated with given original review or rating indicating that no response has been received to the request(s) for update to the original review or rating, and/or any additional data.

In one embodiment, at MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209, the cumulative score or overall rating associated with a given business, service, product, or other content of RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205 is updated when the one or more underlying reviews or ratings are transformed.

In one embodiment, the cumulative score or overall rating associated with a given business, service, product, or other content is updated periodically. In one embodiment, the cumulative score or overall rating associated with a given business, service, product, or other content of RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205 is updated periodically and whenever one or more underlying reviews or ratings are transformed at MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209.

In one embodiment, once the user's update to the original review or rating, and/or any additional data, is/are obtained, and the given review or rating associated with a given business, service, product, or other content of RECEIVE A GIVEN REVIEW OR RATING ASSOCIATED WITH A GIVEN BUSINESS, SERVICE, PRODUCT, OR OTHER CONTENT THROUGH THE REVIEW AND RATING SYSTEM FROM A GIVEN USER OPERATION 205 is transformed to reflect the update to the original review or rating, and/or any additional data, at MODIFY THE GIVEN REVIEW OR RATING ASSOCIATED WITH A GIVEN BUSINESS, SERVICE, PRODUCT, OR OTHER CONTENT IN ACCORDANCE WITH THE UPDATE TO THE GIVEN REVIEW OR RATING OPERATION 209, process flow proceeds to EXIT OPERATION 231.

In one embodiment, at EXIT OPERATION 231 process for obtaining review and rating updates within a review and rating system 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for obtaining review and rating updates within a review and rating system 200, reviews and ratings are more likely to be updated so that the reviews and ratings are potentially more relevant to a current version/form of a given business, service, product, or other content. As a result, using process for obtaining review and rating updates within a review and rating system 200, users of the review and rating systems are less likely to be given false and/or irrelevant impressions and information with respect to a current version of a given business, service, product, or other content being rated. Consequently, all parties involved, i.e., the user, the provider of the review and rating system, and the owner/provider of the given business, service, product, or other content are benefitted by using process for obtaining review and rating updates within a review and rating system 200.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "providing", "storing", "receiving", "displaying", "providing", "processing", "accessing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and system and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for obtaining review and rating updates within a review and rating system comprising:
    two or more computing processors; and
    two or more memories coupled to the one or more processors, the two or more memories having stored therein computing processor executable instructions which when executed by the two or more computing processors perform a process comprising:
    providing a review and rating system implemented on at least one computing system;
    receiving a given review or rating associated with a given business, service, product, or other content from a given user through the review and rating system;
    obtaining contact information for the given user;
    contacting the given user based on the occurrence of one or more events to request an update to, or more information associated with, the given review or rating associated with a given business, service, product, or other content;
    obtaining an update to, or more information associated with, the given review or rating associated with a given business, service, product, or other content from the given user; and
    transforming data representing the given review or rating associated with a given business, service, product, or other content in accordance with the obtained update.

2. The computing system implemented process for obtaining review and rating updates within a review and rating system of claim 1, wherein:
    at least one of the one or more events is the passing of a defined period of time.

3. The computing system implemented process for obtaining review and rating updates within a review and rating system of claim 1, wherein:
    at least one of the one or more events is a change or modification of the given business, service, product, or other content.

4. The computing system implemented process for obtaining review and rating updates within a review and rating system of claim 1, wherein:
    at least one of the one or more events is a change of circumstance external to the given business, service, product, or other content.

5. The computing system implemented process for obtaining review and rating updates within a review and rating system of claim 1, wherein:
    at least one of the one or more events is input from other users of the review and rating system.

6. The computing system implemented process for obtaining review and rating updates within a review and rating system of claim 1, wherein:
    at least one of the one or more events is a desired random or semi-random check of the review and rating system.

7. The computing system implemented process for obtaining review and rating updates within a review and rating system of claim 1, wherein:
    at least one of the one or more events is the presence of defined text or content in a given review or rating.

8. The computing system implemented process for obtaining review and rating updates within a review and rating system of claim 1, wherein the review and rating system is selected from the group of hosts for a review and rating system consisting of:
  a retailer website;
  an Internet warehouse website;
  a product and/or service website;
  a product and/or service provider website;
  a product and/or service producer's website;
  an Internet auction website;
  a community-based website;
  a social interaction website;
  computer system presented ideas;
  computer system presented articles;
  computer system presented books;
  videos;
  links;
  pictures;
  applications;
  systems;
  shared documents and/or presentations; and
  a consumer watchdog site.

9. The computing system implemented process for obtaining review and rating updates within a review and rating system of claim 1, wherein;
  the given user is contacted based on the occurrence of one or more events to request an update to, or more information associated with, the given review or rating associated with a given business, service, product, or other content through the review and rating system.

10. The computing system implemented process for obtaining review and rating updates within a review and rating system of claim 1, wherein;
  the given user is contacted based on the occurrence of one or more events to request an update to, or more information associated with, the given review or rating associated with a given business, service, product, or other content via e-mail.

11. The computing system implemented process for obtaining review and rating updates within a review and rating system of claim 1, wherein;
  the given user is contacted based on the occurrence of one or more events to request an update to, or more information associated with, the given review or rating associated with a given business, service, product, or other content via text messaging.

12. The computing system implemented process for obtaining review and rating updates within a review and rating system of claim 1, wherein;
  the given user is contacted based on the occurrence of one or more events to request an update to, or more information associated with, the given review or rating associated with a given business, service, product, or other content via telephone.

13. A system for obtaining review and rating updates within a review and rating system comprising:
  a computing system having a computing processor and a memory coupled to the computing processor;
  a review and rating system implemented, at least in part on the computing system, the review and rating system including a process for providing dynamically weighted ratings, the process for providing dynamically weighted ratings comprising: providing a review and rating system implemented on at least one computing systems;
  receiving, at the computing system, a given review or rating associated with a given business, service, product, or other content from a given user through the review and rating system;
  obtaining, at the computing system, contact information for the given user;
  contacting, by the computing system, the given user based on the occurrence of one or more events to request an update to, or more information associated with, the given review or rating associated with a given business, service, product, or other content;
  obtaining, by the computing system, an update to, or more information associated with, the given review or rating associated with a given business, service, product, or other content from the given user; and
  transforming, by the computing system, data representing the given review or rating associated with a given business, service, product, or other content in accordance with the obtained update.

14. The system for obtaining review and rating updates within a review and rating system of claim 13, wherein:
  at least one of the one or more events is the passing of a defined period of time.

15. The system for obtaining review and rating updates within a review and rating system of claim 13, wherein:
  at least one of the one or more events is a change or modification of the given business, service, product, or other content.

16. The system for obtaining review and rating updates within a review and rating system of claim 13, wherein:
  at least one of the one or more events is a change of circumstance external to the given business, service, product, or other content.

17. The system for obtaining review and rating updates within a review and rating system of claim 13, wherein:
  at least one of the one or more events is input from other users of the review and rating system.

18. The system for obtaining review and rating updates within a review and rating system of claim 13, wherein:
  at least one of the one or more events is a desired random or semi-random check of the review and rating system.

19. The system for obtaining review and rating updates within a review and rating system of claim 13, wherein:
  at least one of the one or more events is the presence of defined text or content in a given review or rating.

20. The system for obtaining review and rating updates within a review and rating system of claim 13, wherein:
  the review and rating system is selected from the group of hosts for a review and rating system consisting of:
  a retailer website;
  an Internet warehouse website;
  a product and/or service website;
  a product and/or service provider website;
  a product and/or service producer's website;
  an Internet auction website;
  a community-based website;
  a social interaction website;
  computer system presented ideas;
  computer system presented articles;
  computer system presented books;
  videos;
  links;
  pictures;
  applications;
  systems;
  shared documents and/or presentations; and
  a consumer watchdog site.

21. The system for obtaining review and rating updates within a review and rating system of claim 13, wherein:
the given user is contacted based on the occurrence of one or more events to request an update to, or more information associated with, the given review or rating associated with a given business, service, product, or other content through the review and rating system.

22. The system for obtaining review and rating updates within a review and rating system of claim 13, wherein:
the given user is contacted based on the occurrence of one or more events to request an update to, or more information associated with, the given review or rating associated with a given business, service, product, or other content via e-mail.

23. The system for obtaining review and rating updates within a review and rating system of claim 13, wherein:
the given user is contacted based on the occurrence of one or more events to request an update to, or more information associated with, the given review or rating associated with a given business, service, product, or other content via text messaging.

24. The system for obtaining review and rating updates within a review and rating system of claim 13, wherein:
the given user is contacted based on the occurrence of one or more events to request an update to, or more information associated with, the given review or rating associated with a given business, service, product, or other content via telephone.

25. A computing program product for obtaining review and rating updates within a review and rating system comprising:
a nontransitory computer readable medium, the nontransitory computer readable medium having stored thereon instructions which when executed by a computing processor, perform a process comprising:
providing a review and rating system implemented on at least one computing system;
receiving a given review or rating associated with a given business, service, product, or other content from a given user through the review and rating system;
obtaining contact information for the given user;
contacting the given user based on the occurrence of one or more events to request an update to, or more information associated with, the given review or rating associated with a given business, service, product, or other content;
obtaining an update to, or more information associated with, the given review or rating associated with a given business, service, product, or other content from the given user; and
transforming data representing the given review or rating associated with a given business, service, product, or other content in accordance with the obtained update.

26. The computing program product for obtaining review and rating updates within a review and rating system of claim 25, wherein:
at least one of the one or more events is the passing of a defined period of time.

27. The computing program product for obtaining review and rating updates within a review and rating system of claim 25, wherein:
at least one of the one or more events is a change or modification of the given business, service, product, or other content.

28. The computing program product for obtaining review and rating updates within a review and rating system of claim 25, wherein:
at least one of the one or more events is a change of circumstance external to the given business, service, product, or other content.

29. The computing program product for obtaining review and rating updates within a review and rating system of claim 25, wherein:
at least one of the one or more events is input from other users of the review and rating system.

30. The computing program product for obtaining review and rating updates within a review and rating system of claim 25, wherein:
at least one of the one or more events is a desired random or semi-random check of the review and rating system.

31. The computing program product for obtaining review and rating updates within a review and rating system of claim 25, wherein:
at least one of the one or more events is the presence of defined text or content in a given review or rating.

32. The computing program product for obtaining review and rating updates within a review and rating system of claim 25, wherein the review and rating system is selected from the group of hosts for a review and rating system consisting of:
a retailer website;
an Internet warehouse website;
a product and/or service website;
a product and/or service provider website;
a product and/or service producer's website;
an Internet auction website;
a community-based website;
a social interaction website;
computer system presented ideas;
computer system presented articles;
computer system presented books;
videos;
links;
pictures;
applications;
systems;
shared documents and/or presentations; and
a consumer watchdog site.

33. The computing program product for obtaining review and rating updates within a review and rating system of claim 25, wherein;
the given user is contacted based on the occurrence of one or more events to request an update to, or more information associated with, the given review or rating associated with a given business, service, product, or other content through the review and rating system.

34. The computing program product for obtaining review and rating updates within a review and rating system of claim 25, wherein;
the given user is contacted based on the occurrence of one or more events to request an update to, or more information associated with, the given review or rating associated with a given business, service, product, or other content via e-mail.

35. The computing program product for obtaining review and rating updates within a review and rating system of claim 25, wherein;
the given user is contacted based on the occurrence of one or more events to request an update to, or more information associated with, the given review or rating associated with a given business, service, product, or other content via text messaging.

36. The computing program product for obtaining review and rating updates within a review and rating system of claim 25, wherein;

the given user is contacted based on the occurrence of one or more events to request an update to, or more information associated with, the given review or rating associated with a given business, service, product, or other content via telephone.

* * * * *